(12) United States Patent
Saleh et al.

(10) Patent No.: US 6,212,391 B1
(45) Date of Patent: Apr. 3, 2001

(54) METHOD FOR POSITIONING GSM MOBILE STATION

(75) Inventors: Bilal A. Saleh, Prospect Heights; Paul V. Flynn, Glen Ellyn, both of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/186,911

(22) Filed: Nov. 6, 1998

Related U.S. Application Data

(60) Provisional application No. 60/067,069, filed on Dec. 1, 1997.

(51) Int. Cl.[7] .................................................. H04Q 7/20
(52) U.S. Cl. ........................ 455/456; 342/450; 342/457
(58) Field of Search .................................. 455/456, 457, 455/502, 524, 440, 422, 404, 414, 552, 553, 405, 420, 459, 461; 342/457, 357, 450, 463, 465, 357.1, 357.09, 357.07; 701/207, 213, 217, 300, 302; 340/988–995

(56) References Cited

U.S. PATENT DOCUMENTS

| | | | |
|---|---|---|---|
| 5,095,500 | * 3/1992 | Tayloe et al. | 379/32 |
| 5,396,540 | * 3/1995 | Gooch | 455/456 |
| 5,515,419 | * 5/1996 | Sheffer | 455/456 |
| 5,600,706 | * 2/1997 | Dunn et al. | 455/456 |
| 5,883,598 | * 3/1999 | Paul et al. | 455/456 |
| 5,890,064 | * 3/1999 | Widergen et al. | 455/445 |
| 5,905,957 | * 5/1999 | Olds | 455/435 |
| 5,926,133 | * 7/1999 | Green, Jr. | 342/463 |
| 5,973,643 | * 10/1999 | Hawkes et al. | 342/457 |
| 6,002,932 | * 12/1999 | Kingdon et al. | 455/433 |
| 6,006,097 | * 12/1999 | Hornfeldt et al. | 455/456 |
| 6,011,974 | * 1/2000 | Cedervall et al. | 455/456 |
| 6,014,102 | * 1/2000 | Mitzlaff et al. | 342/457 |
| 6,041,231 | * 3/2000 | Suzuki | 455/422 |

FOREIGN PATENT DOCUMENTS 2 264 837 * 9/1993 (GB) ................................. G01S/5/14

OTHER PUBLICATIONS

Vaughan, Radio Location Determination And Notification, Jun. 1995.*

* cited by examiner

*Primary Examiner*—Dwayne Bost
*Assistant Examiner*—Jean A Gelin
(74) *Attorney, Agent, or Firm*—John B. MacIntyre; Kenneth A. Haas; Lalita P. Williams

(57) ABSTRACT

The present invention provides a method for positioning GSM mobile stations. Positioning information for a Mobile Station (102) is requested by a Base Station Subsystem (117) from Location Determination Equipment (113). The Location Determination Equipment (113) return signal measurements relating to the Mobile Station (102) to the Base Station Subsystem (117). The Base Station Subsystem (117) requests a location calculation from a Mobile Positioning Register (111). The Mobile Positioning Register (111) computes the position of the mobile station (102) based at least in part upon the signal measurements. The position of the Mobile Station (102) is then returned to the Base Station Subsystem (117).

33 Claims, 12 Drawing Sheets

MESSAGE FLOW FOR MOBILE ORIGINATED REQUEST
FOR POSITIONING IN A NETWORK-CENTRIC APPROACH

MESSAGE FLOW FOR NETWORK ORIGINATED REQUEST FOR POSITIONING IN A NETWORK-CENTRIC APPROACH

MESSAGE FLOW FOR EMERGENCY CALLS IN A NETWORK-CENTRIC APPROACH

MESSAGE FLOW FOR MOBILE ORIGINATED REQUEST FOR POSITIONING IN A MOBILE-ASSISTED APPROACH

MESSAGE FLOW FOR EMERGENCY CALLS IN A MOBILE-ASSISTED APPROACH

MESSAGE FLOW FOR EXTERNAL APPLICATIONS TO ACQUIRE MS LOCATION INFORMATION IN A MOBILE-ASSISTED APPROACH

METHOD FOR POSITIONING GSM MOBILE STATION

This application claims benefit of Provisional 60/067,069, filed Dec. 1, 1997.

FIELD OF THE INVENTION

The present invention relates generally to communication systems, and more particularly to a method and apparatus for positioning Group Special Mobile (GSM) mobile stations in a communication system.

BACKGROUND OF THE INVENTION

For the past several years, a variety of Group Special Mobile (GSM) network operators have expressed the need for the ability to determine the position of a mobile station to allow them to offer services based on the location of the mobile station. Examples of such services are location-sensitive billing and location-based yellow pages services. Such services must provide the mobile station's position with enough precision to allow the network operator to offer a meaningful network service. In addition, the Federal Communications Commission in the United States has mandated as part of Docket 94-102 that wireless network operators be able to provide the position of a mobile station to within 125 meters 67% of the time by April 2001.

Currently, no solution exists in GSM for determining the position of a mobile station with the assistance of the mobile, nor with the assistance of an adjunct radio device. The positioning solution must support the ability to determine the position of the mobile station in the following cases:

A request by the mobile station to the network for the mobile station's position. This must be supported when the mobile station is engaged in a call and when the mobile is in idle mode, not engaged in a call.

A request by service logic in the network for the position of a mobile. In particular, the solution must support the determination of a mobile station's position within a CAMEL call.

A request by an external location services application for the location of a mobile station. The network must be able to determine the position of the mobile station and return the position to the external application either within a call or independent of a call. This external application is service logic that resides outside the GSM network's boundaries.

An emergency call by a mobile station. The network must determine the position of the mobile station during call setup to allow service logic associated with the emergency number to route the call to the appropriate destination. The network architecture must support ability to determine the position of the mobile station within the objective set by the FCC in Docket 94-102, 125 meters.

To accomplish this, the GSM network requires a new network element and new capabilities in the network:

A new network element to calculate the position of the mobile station,

New procedures in existing GSM network elements to support positioning,

Extensions of the protocols between these network elements to convey position-related information between the network elements.

DETAILED DESCRIPTION OF A PREFERRED EMBODIMENT

Figure 1:
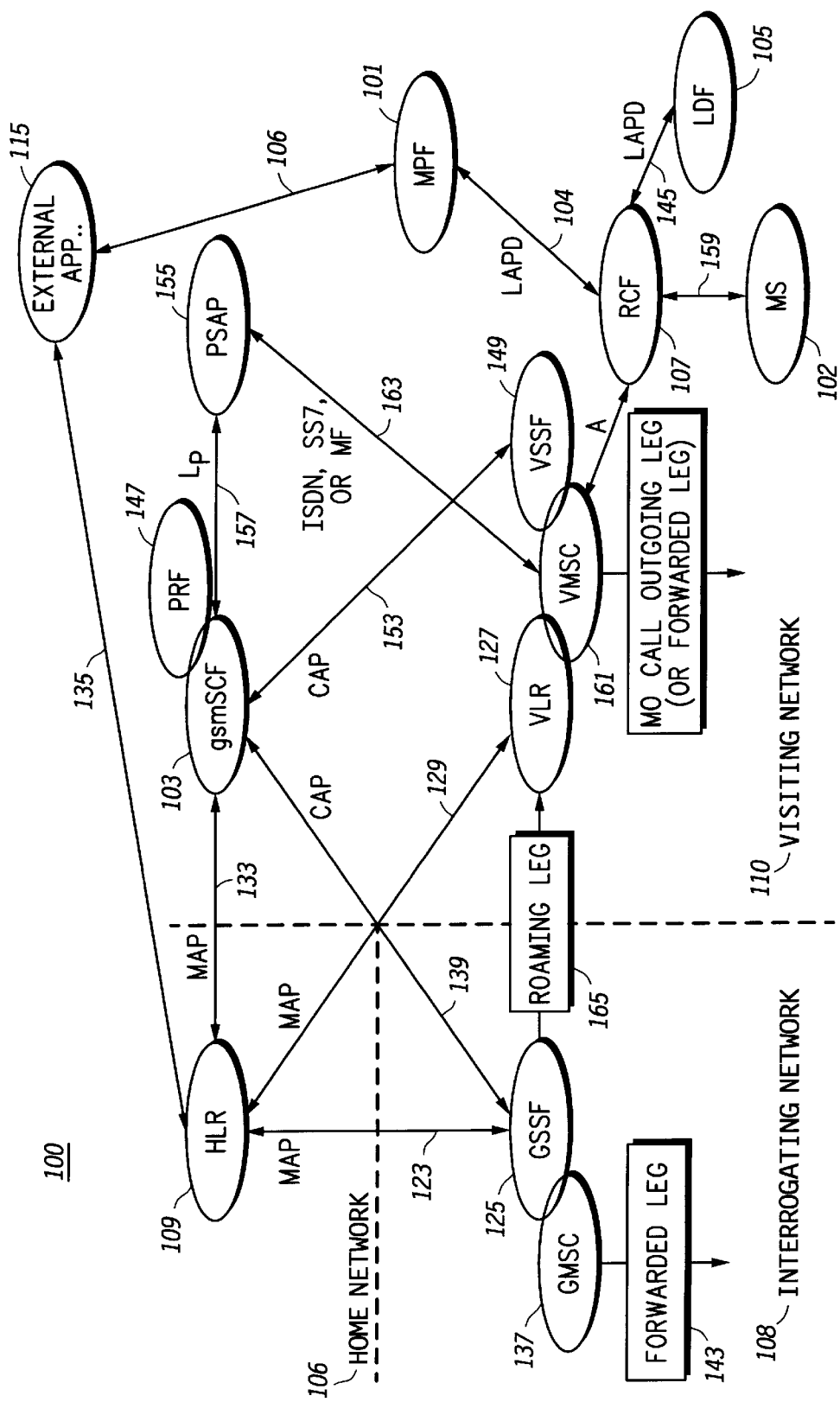
FIG. 1 depicts a functional model of a communication system in accordance with a preferred embodiment of the present invention.

The present invention relates to an architecture that enables a Group Special Mobile (GSM) network to support Emergency Calls and to offer Location Services. The present invention extends the stage 2 description of Customized Applications for Mobile Enhanced Logic (CAMEL) within the digital cellular telecommunications system (Phase 2/Phase 2+) for the support of Emergency Calls and Location Services. GSM Technical Specification 03.78 Version 0.10.0 was used as a baseline to describe the CAMEL enhancements to support Emergency Calls and Location Services.

The architecture proposed by this invention attempts to minimize the impact on the existing GSM network by maximizing the re-use of the existing elements, protocols, and interfaces, and by minimizing the introduction of new ones.

The present invention provides a Network-centric and a Mobile-assisted architecture that allow for the introduction of new Emergency Calls and Location Services into the North American Digital Personal Communications Systems 1900 MHz (PCS1900). The architecture of the present invention addresses the network-centric and mobile-assisted approaches of location services.

Generally, there are two approaches for Mobile Station (MS) positioning: a Network-Centric approach and a Mobile-Assisted approach. The Network-Centric approach is described with reference to FIGS. 1–6 below, while the Mobile-Assisted approach is described with reference to FIGS. 7–12 below.

For the network-centric approach, the architecture assumes the existence of a network element, referred to as Location Determination Equipment (LDE). The LDE is used to perform signal measurements such as Time Of Arrival (TOA) and Time Difference Of Arrival (TDOA). The network then applies algorithmic computation onto the signal arrival measurements to determine the final MS location.

The LDE and the algorithms used to compute the final location is considered to be well known in the art and will not be discussed herein.

For the mobile-assisted approach architecture assumes that a GSM mobile station is enhanced such that it is capable of performing accurate signal measurements. The mechanisms and algorithms involved in the signal arrival measurements and position algorithm calculation are considered to be well known in the art and will not be discussed herein.

The following are abbreviations used in this patent application:

| | |
|---|---|
| AOA | Angle of Arrival |
| BSC | Base Station Controller |
| BSS | Base Station Subsystem |
| BTS | Base Transceiver Station |
| CAMEL | Customized Application for Mobile Enhanced Logic |
| CSE | CAMEL Service Environment |
| CSI | CAMEL Subscriber Information |
| GSM | Global System for Mobile communications, or Groupe Special Mobile |
| GSM SCF | GSM Service Control Function |
| LC | Location Calculator |
| LDE | Location Determination Equipment |
| LDF | Location Determination Function |
| LCF | Location Control Function |
| RCF | Radio Control Function |
| LIB | Location Information Base |
| MPF | Mobile Positioning Function |
| MPR | Mobile Positioning Register |
| PSAP | Public Safety Answering Point |
| PRF | PSAP Routing Function |
| TDOA | Time Difference of Arrival |
| TOA | Time of Arrival |

The present invention can be best understood with reference to FIGS. 1–12.

FIG. 1 depicts the functional architecture of the present invention as related to the Network-Centric approach. More specifically, FIG. 1 depicts the architecture needed to support the network-centric Location Services as an extension of the CAMEL architecture. FIG. 1 shows the functional entities involved in CAMEL calls requiring Location Services support.

Network 100 includes a Home Network 106, an Interrogating Network 108, and a Visiting Network 110. Home Network 106 includes an HLR 109. HLR 109 is connected via MAP interface 123 to GSSF 125 located in Interrogating Network 108. HLR is connected to VLR 127 via MAP interface 129. HLR 109 is connected to GSM SCF 103 via MAP interface 133. HLR 109 is connected to external application 115 via interface 135.

Interrogating Network 108 includes GSSF 125 and GMSC 137. GSSF 125 is connected to HLR 109 via MAP interface 123, and is also connected to GSN SCF 103 via CAP interface 139. GMSC 137 is connected to GSSF 125 and includes a forwarded leg 143.

Visiting Network 110 includes GSM SCF that is connected to PRF 147. GSM SCF 103 is connected to VSSF 149 via a CAP interface 153 and is connected to a PSAP 155 via an Lp interface 157. External application 115 is connected to MPF 101 via a TCAP (TBD) interface 106. MPF 101 is connected to RCF 107 via an LAPD interface 104. RCF 107 is connected to LDF 105 via LAPD interface 145. RCF 107 is connected to MS 102 via an over the air interface 159. PSAP 155 is connected to VMSC 161 via an interface 163. Interface 163 is preferably an ISDN interface, but can alternately be an SS7 or an MF interface. VMSC is connected to VSSF 149 and VLR 127. VLR 127 is connected to GSSF 125 of interrogating network 108 via roaming leg 165.

Figure 2:
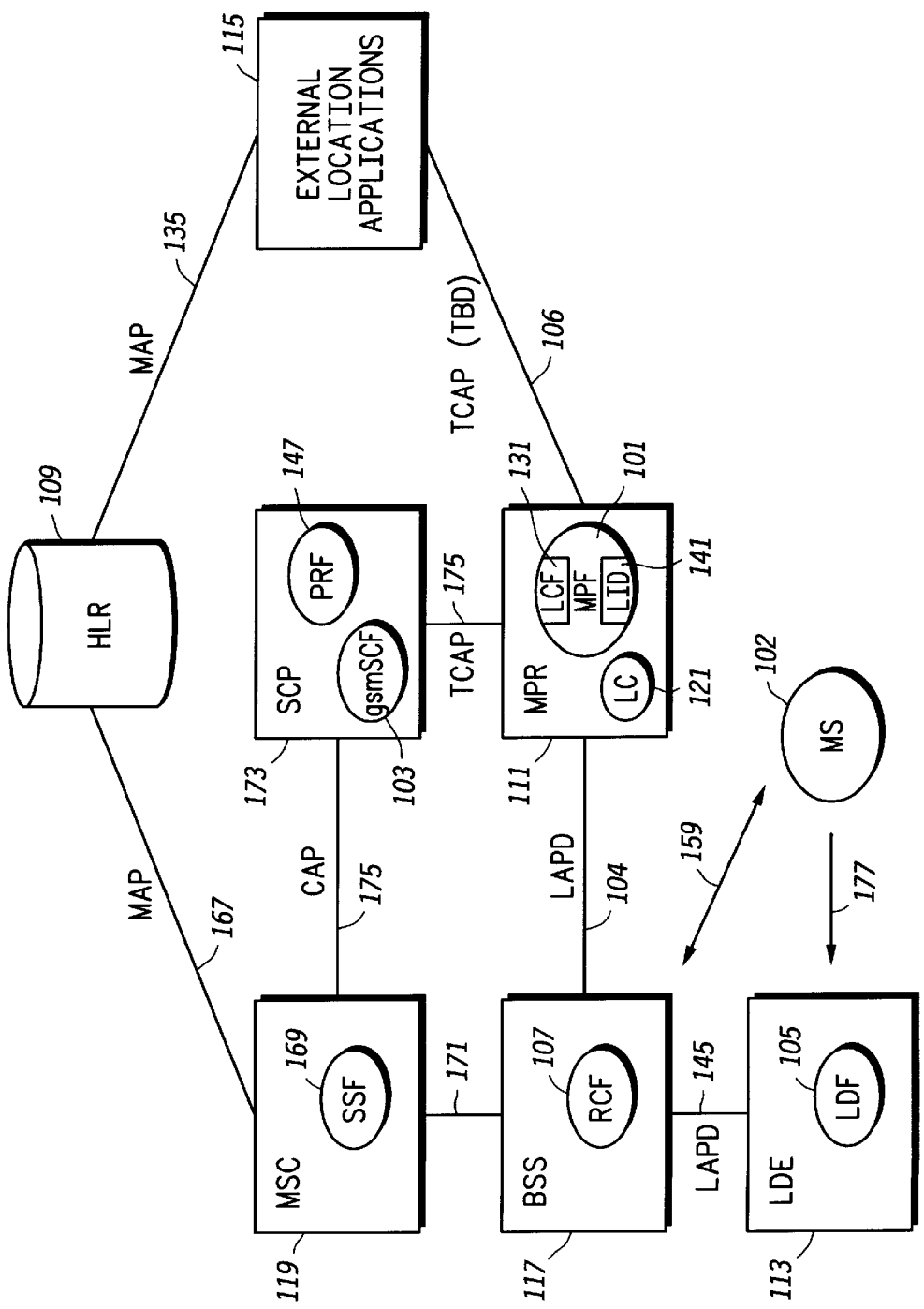
FIG. 2 depicts architecture of the network elements in accordance with the preferred embodiment of the present invention.

The primary task of MPF 101 is to provide location information to GSM SCF 103 and external Location Based Services applications. This task is broken down into two functions: Location Calculation Function (LCF) 131 and storing location information in a Location Information Base (LIB) 141, as depicted in FIG. 2.

LCF 131 obtains signal measurements of a radio channel from LIB 141, and performs algorithmic calculations on the data to compute the final location of MS 102 associated with that radio channel. LCF 131 stores the final location data in LIB 141.

Multiple LDF 105s may cooperate to collect signal measurements of a single MS 102. In that case LCF 131 correlates all the data feeds from all LDF 105s to a specific MS 102. LIB 141 is the data base that stores the location information for MS 102.

The main responsibility of LDF 105 is to collect and report MS 102 signal measurements such as TDAO, TOA, and AOA.

RCF 107 represents the combined functionalities of the GSM BSC 117 and BTS. The standard GSM BSS 117 is the Network Element that performs the RCF 107 functionality.

External location applications 115 are applications that are authorized to obtain MS 102 location information outside the scope of CAMEL and MSC 119. Those applications 115 can obtain MS 102 location information through MPF 101.

RCF 107-MPF 101 Interface 104 is an LAPD interface that allows MPF 101 to request signal arrival data from RCF 107. Interface 104 also allows RCF 107 to request MPF 101 to compute an MS's position based on signal arrival data.

The External Application-MPF 101 Interface 106 allows an external location application to query MPF 101 for an MS's position.

Location Calculator (LC) 121 is a process that is part of Mobile Positioning Register (MPR) 111 that calculates the final location of MS 102 based on signal measurements captured by the Location Determination Equipment (LDE) 113. LC 121 stores the final location information in LIB 141.

Location Calculation Function (LCF) 131 is a functional entity that is part of Mobile Positioning Function (MPF) 101. LCF 131 performs an MS 102 position computation function.

Location Determination Function (LDF) 105 is a functional entity that measures different aspects of an MS signal, such as TDOA, TOA, and AOA.

Location Information Base (LIB) 141 is a database that stores a Mobile Station's location information.

Mobile Positioning Function (MPF) 101 is a functional entity that interfaces to Radio Control Function (RCF) 107 and LDF 105. MPF 101 is responsible for calculating, storing, and providing access to the location information. MPF 101 contains LCF 131 and LIB 141.

The Network-Centric approach utilizes a positioning radio device, called Location Determination Equipment (LDE) 113, to measure certain aspects of MS radio signal, such as TDOA, TOA, and AOA. LDE 113 comprises a hardware and/or software element that collects signal measurements, such as Time Difference of Arrival (TDOA), Time of Arrival (TOA), and Angle of Arrival (AOA), of a specific MS 102. LDE 113 stores the collected data in LIB 141.

A network element called the Mobile Positioning Register (MPR) 111 that receives these measurements is used to calculate the mobile station's final position. LDE 113 is installed in the network in either an overlay or embedded fashion. Potentially, this approach does not require enhancements to MS 102. LDE 113 measures the signal transmitted by MS 102 to determine aspects of the MS's signal such as TDOA, TOA, or AOA. While this does not require enhancements to MS 102, the network-centric approach requires MS 102 to be transmitting long enough and consistently enough to allow LDE 113 to gather sufficient measurements of MS 102. Because of this, MS 102 must be engaged in a call, with uplink discontinuous transmission disabled, to allow these measurements to be made in a reasonable amount of time. Consequently, it is difficult for the network-centric approach to support the positioning of an MS 102 when MS 102 is in idle mode or otherwise not transmitting continuously.

MPR 111 is a common network element that is used by the Network-centric and the Mobile-assisted approaches. MPR Ill is a network element that collapses the functionality of LCF 131 and LIB 141 into a single element.

Generally, Location Based Services can be classified as Intelligent Network Services, i.e., CAMEL services. The proposed architectures enhance the current CAMEL functional model in order to support Location Based Services.

An additional piece of subscriber information required in both the network-centric and mobile-assisted architectures is the identity of MPR 111 serving MS 102. This information is required to allow an external location application to request the position of an MS. This additional element of subscriber information is stored in HLR 109 and is updated as necessary when BSS 117 serving MS 102 changes, such as during handover. The storage of the address of MPR 111 is dependent on the network used transporting messages between the external location application and MPR 111. For example, if both the external application and MPR 111 are signaling points in the network operator's SS7 network, the address of MPR 111 could be obtained through global title translation.

FIG. 2 depicts a possible mapping of the enhanced GSM Network-Centric location services architecture into Network Elements. HLR 109 is connected to MSC 119 via a MAP interface and is connected to External Location Applications 115 via MAP interface 135. MSC 119 includes SSF 169. MSC 119 is connected to BSS 117 via interface 171, and to SCP 173 via CAP interface 175. SCP 173 includes PRF 147 and GSM SCF 103. SCP 173 is connected to MPR 111 via TCAP interface 175. MPR 111 includes MPF 101 and LC 121. MPF 101 includes LCF 131 and LIB 141. MPR 111 is connected to BSS 117 via LAPD interface 104 and to External Location Applications 115 via TCAP interface 106. BSS 117 is connected to LDE 113 via LAPD interface 145. LDE 113 includes LDF 105. MS 102 communicates with BSS 117 via communication link 159 and to LDE 113 via communication link 177.

Figure 3:
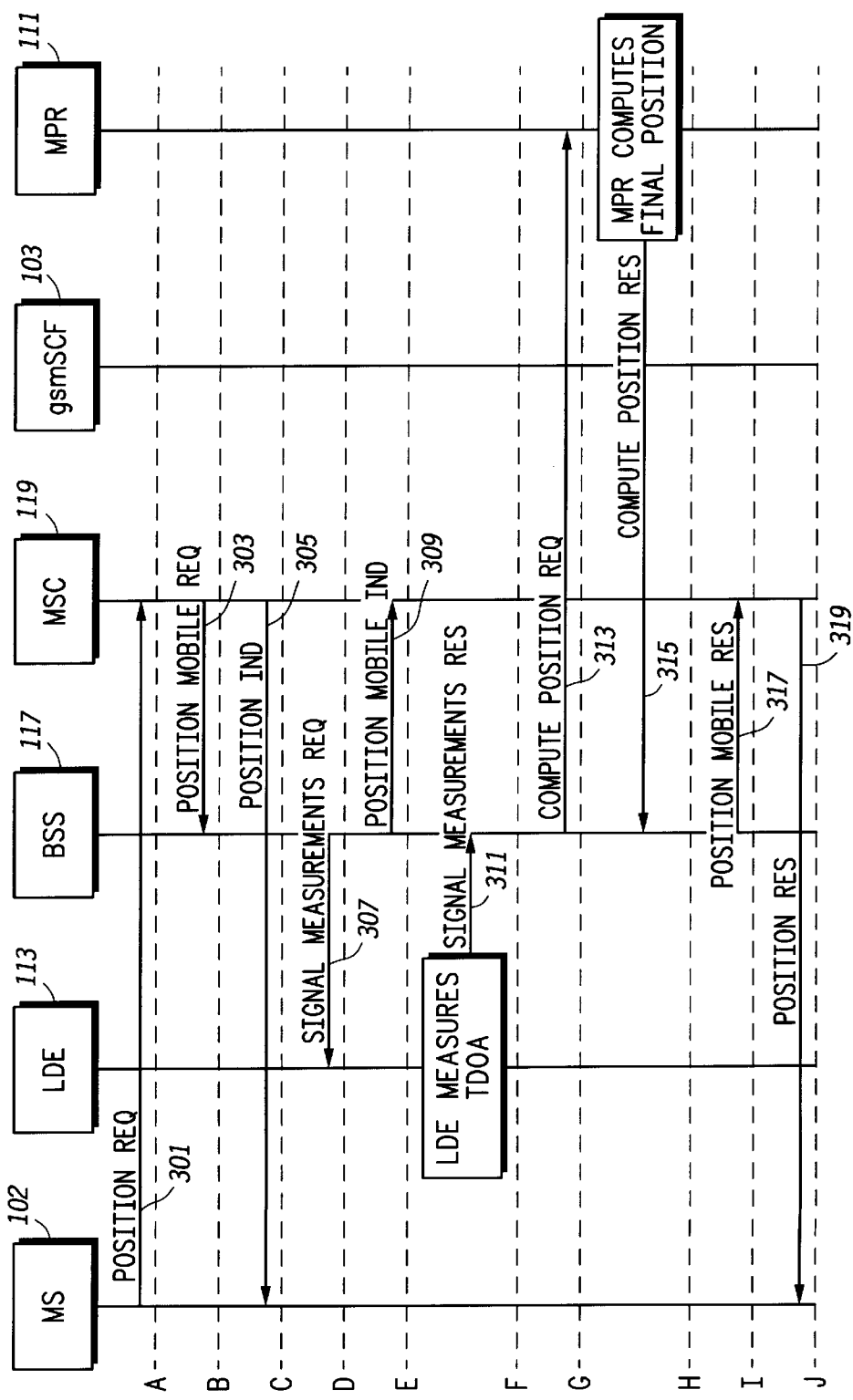
FIG. 3 depicts a communication call flow in accordance with the preferred embodiment of the present invention.

FIG. 3 describes the call flow procedure for a mobile station originated request for positioning utilizing a network-centric approach. The mobile station-originated request for positioning may occur in the context of a call, or it may occur independent of a call. In both situations, the mobile station initiates a request for positioning from the network.

a) MS 102 requests its position from network 100 in a Position Request (DTAP) message 301 from MS 102 to MSC 119.

b) MSC 119 requests BSS 117 to position MS 102 in a Position Mobile Request (BSS 117MAP) message 303 from MSC 119 to BSS 117.

c) MSC 119 responds to MS 102 with a Position Indication (DTAP) message 305 from MSC 119 to MS 102.

d) BSS 117 requests positioning information from LDE 113 in a Signal Arrival Request message 307 from BSS 117 to LDE 113.

e) BSS 117 responds to MSC 119 with a Position Mobile Indication message 309 from BSS 117 to MSC 119.

f) LDE 113 measures signal measurements, such as TDOA, TOA, or AOA, and returns a positioning report to BSS 117 in a Signal Measurements Response message 311 from LDE 113 to BSS 117.

g) BSS 117 requests a location calculation from MPR 111 in a Compute Position Request message 313 from BSS 117 to MPR 111.

h) MPR 111 computes MS 102 position based on the signal measurements and returns the computed MS position to BSS 117 in a Compute Position Response message 315 from MPR 111 to BSS 117.

i) BSS 117 reports MS 102's position to MSC 119 in a Position Mobile Response message 317 from BSS 117 to MSC 119.

j) MSC 119 reports MS 102's position to MS 102 in a Position Response (DTAP) message 319 from MSC 119 to MS 102.

Figure 4:
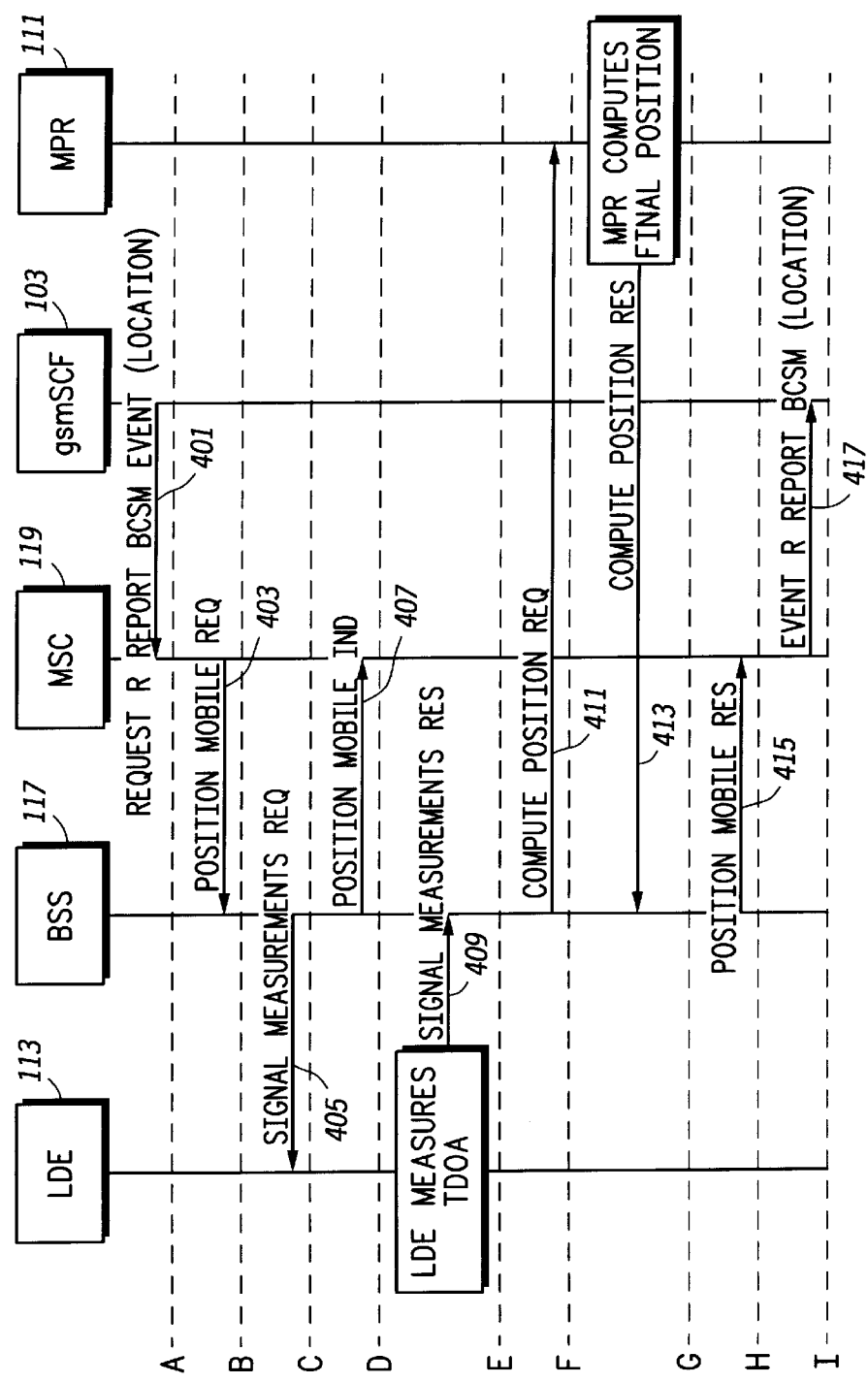
FIG. 4 depicts a communication call flow in accordance with the preferred embodiment of the present invention.

FIG. 4 depicts a call flow for a network-originated request for positioning utilizing a network-centric approach. The request occurs in the context of a CAMEL message flow, with the location application residing in a GSM SCF 103. In such a message flow, MSC 119 performs an InitialDP procedure as specified in GSM 09.78, delivering the call to GSM SCF 103. The following message flow assumes that a call has been delivered to GSM SCF 103 and thus begins with a request from GSM SCF 103 to MSC 119 for a location and ends with MSC 119 reporting the location to GSM SCF 103. The rest of GSM SCF 103-MSC 119 message flow is dependent on the location application and is beyond the scope of this message flow.

a) GSM SCF 103 requests MSC 119 to position MS 102 in a RequestReportBCSMEvent(Location) message 401 from GSM SCF 103 to MSC 119.

b) MSC 119 requests BSS 117 to position MS 102 in a Position Mobile Request message 403 from MSC 119 to BSS 117.

c) BSS 117 requests signal measurements, such as time difference of arrival, time of arrival, or angle of arrival, from LDE 113 in a Signal Arrival Request message 405 from BSS 117 to LDE 113.

d) BSS 117 responds to MSC 119 with a Position Mobile Indication (BSS 117MAP) message 407 from BSS 117 to MSC 119.

e) LDE 113 performs signal related measurements, such as measuring TDOA, TOA, or AOA, and returns a Signal Measurements Response message 409 from LDE 113 to BSS 117.

f) BSS 117 requests a location calculation from MPR 111 in a Compute Position Request message 411 from BSS 117 to MPR 111.

g) MPR 111 computes the position of MS 102 based on the received signal measurements and returns the computed MS position to BSS 117 in a Compute Position Response message 413 from MPR 111 to BSS 117.

h) BSS 117 reports the position of MS 102 to MSC 119 in a Position Mobile Response message 415 from BSS 117 to MSC 119.

i) MSC 119 responds to GSM SCF 103 with the position of MS 102 in an EventReportBCSM(Location) message 417 from MSC 119 to GSM SCF 103.

Figure 5:
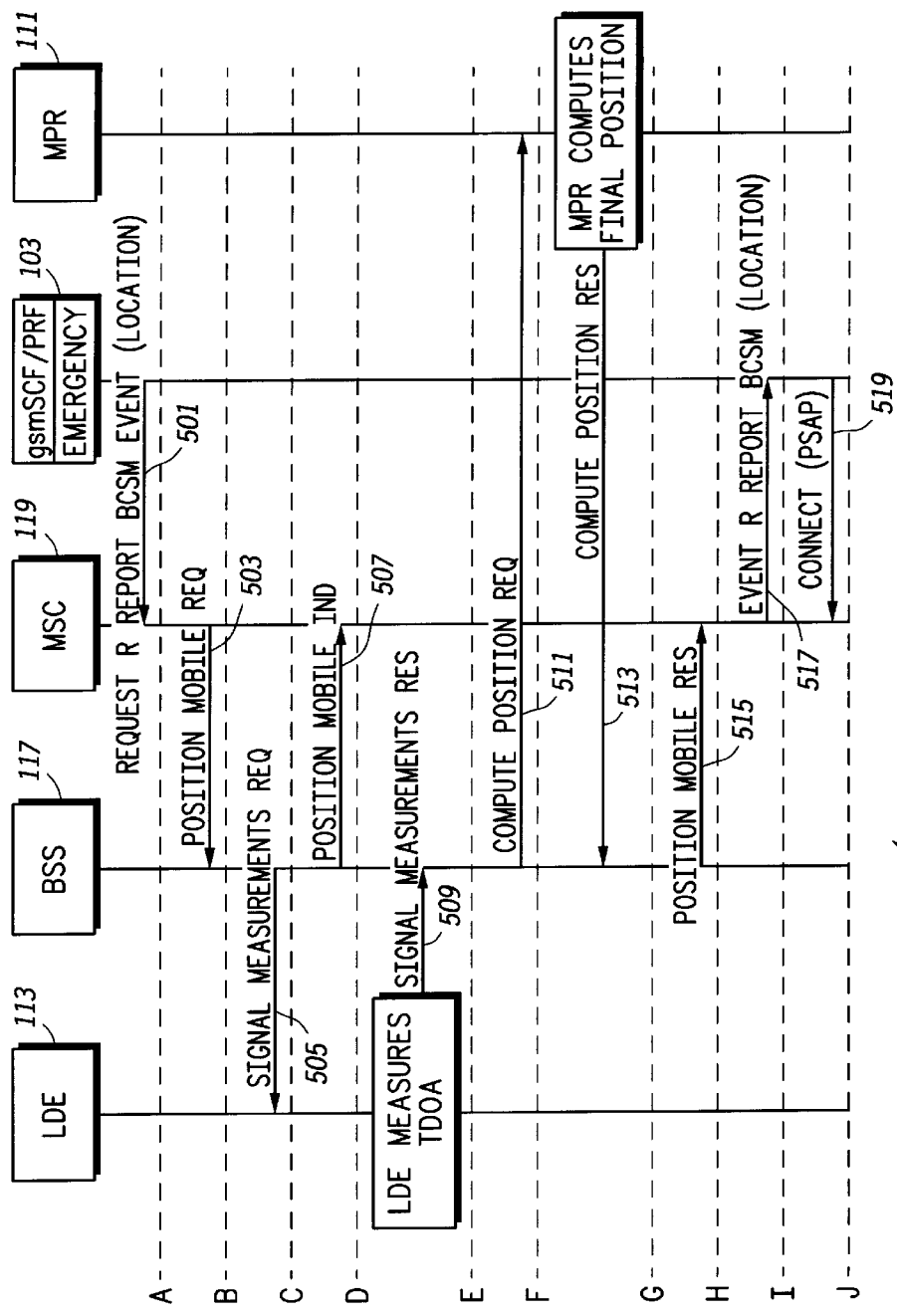
FIG. 5 depicts a communication call flow in accordance with the preferred embodiment of the present invention.

FIG. 5 depicts a call flow for an emergency call utilizing a network-centric approach. Emergency calls proceed in a manner similar to a network-originated request for positioning as depicted with regard to FIG. 4. As with the network-originated message flow in FIG. 4, the request to position an MS originates from a GSM SCF 103. In the case of emergency calls, however, GSM SCF 103 could be a special emergency services GSM SCF and will reside in the visited network, rather than in the caller's home network. As depicted in FIG. 5, this message flow assumes the Emergency GSM SCF 103 also contains the PSAP Routing Function (PRF). The PRF provides call routing information to direct the call to the PSAP serving the MS's location.

a) Emergency GSM SCF 103 requests MSC 119 to position MS 102 in a RequestReportBCSMEvent(Location) message 501 from Emergency GSM SCF 103 to MSC 119.

b) MSC 119 requests BSS 117 to locate the position of MS 102 in a Position Mobile Request (BSS 117MAP) message 503 from MSC 119 to BSS 117.

c) BSS 117 requests signal measurements, such as time difference of arrival, time or arrival, or angle of arrival, from LDE 113 in a Signal Arrival Request message 505 from BSS 117 to LDE 113.

d) BSS 117 responds to MSC 119 with a Position Mobile Indication message 507 from BSS 117 to MSC 119.

e) LDE 113 performs location-related measurements, such as TDOA, TOA, or AOA, and returns a Signal Measurements Response message 509 from LDE 113 to BSS 117.

f) BSS 117 requests a location calculation from MPR 111 in a Compute Position Request message 511 from BSS 117 to MPR 111 g) MPR 111 computes the position of MS 102 based on the received signal measurements and returns the computed MS position to BSS 117 in a Compute Position Response message 513 from MPR 111 to BSS 117.

h) BSS 117 reports the position of MS 102 to MSC 119 in a Position Mobile Response (BSS 117MAP) message 515 from BSS 117 to MSC 119.

i) MSC 119 responds to Emergency GSM SCF 103 with the location of MS 102 in an EventReportBCSM(Location) message 517 from MSC 119 to Emergency GSM SCF 103.

j) Emergency GSM SCF 103 directs MSC 119 to route the call to the appropriate PSAP in a Connect(PSAP) message 519 from Emergency GSM SCF 103 to MSC 119.

As stated above, this message flow assumes that Emergency GSM SCF 103 and the PRF are combined. Alternatively, Emergency GSM SCF 103 and the PRF could be two separate functions. In this case, Emergency GSM SCF 103 queries the PRF with the location of MS 102 and receives the routing number of the serving PSAP. The Emergency GSM SCF 103 then returns the routing number and MS location to MSC 119.

Figure 6:
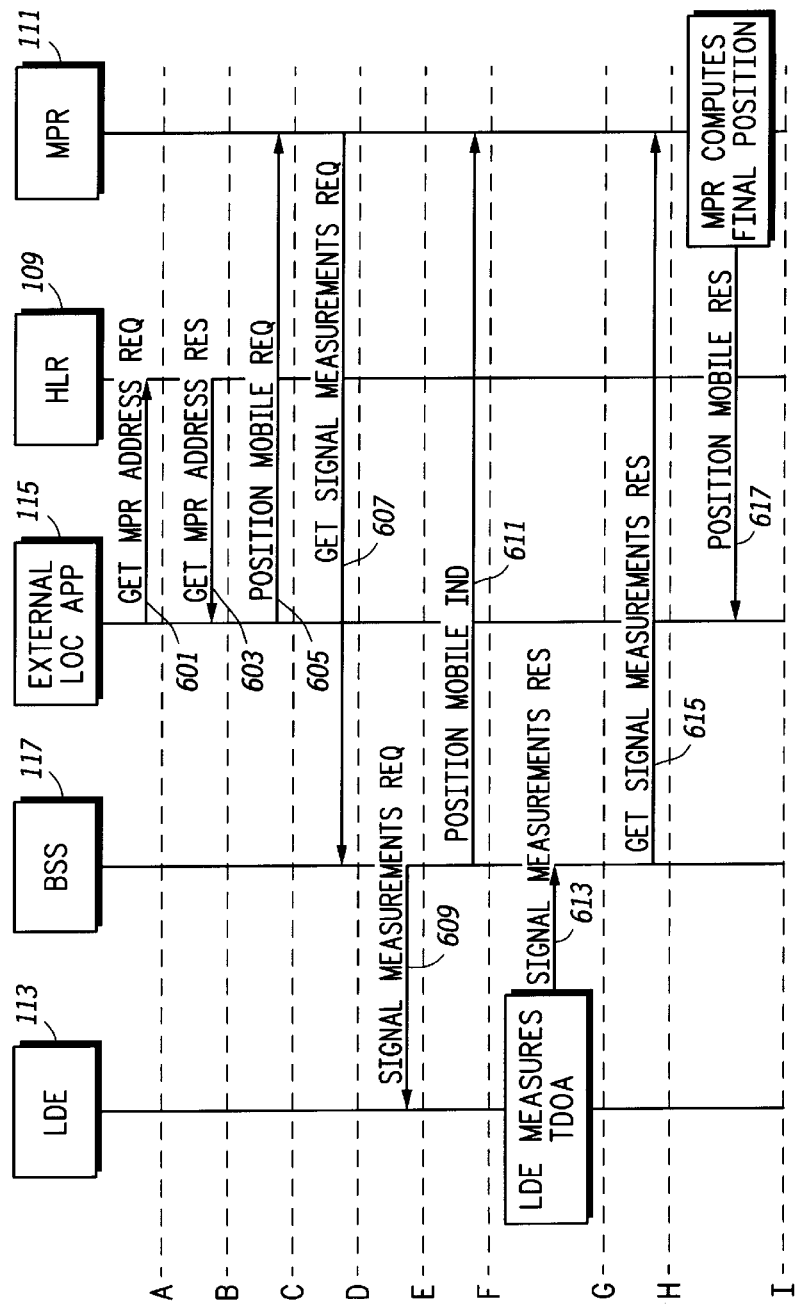
FIG. 6 depicts a communication call flow in accordance with the preferred embodiment of the present invention.

FIG. 6 depicts a call flow for external application to acquire the location information of a mobile station utilizing a network-centric approach. Such requests proceed in a manner similar to a network-originated request for positioning. As with the network-originated message flow above, the request to position an MS need not be associated with a call. This message begins with a position request from an external location application and ends with the external application receiving the location of the application. It is assumed that the external application is secure and authorized to query the MPR 111 for MS location information.

a) An external location application 115 begins the process of requesting the position of an MS 102 from the network by sending a Get MPR 111 Address Request message 601 from external location application 115 to HLR 109.

b) HLR 109 returns the address of MPR 111 serving MS 102 in a Get MPR 111 Address Response message 603 from HLR 109 to external application 115.

c) External location application 115 requests the location of MS 102 from MPR 111 by sending a Position Mobile Request message 605 from external application 115 to MPR 111.

d) MPR 111 requests position information from BSS 117 by sending a Get Position Data Request message 607 from MPR 111 to BSS 117.

e) BSS 117 requests signal information, such as time difference of arrival, time of arrival, or angle of arrival, from LDE 113 by sending a Signal Arrival Request message 609 from BSS 117 to LDE 113.

f) BSS 117 responds to MSC 119 with a Position Mobile Indication (BSS 117MAP) message 611 from BSS 117 to MSC 119.

g) LDE 113 performs signal measurements, such as TDOA, TOA, or AOA, and returns a Signal Measurements Response message 613 from LDE 113 to BSS 117.

h) Upon receiving the location-related measurements from LDE 113, BSS 117 sends a Get Position Data Response message 615 containing the measurements to MPR 111.

i) MPR 111 uses the signal measurements to calculate the position of MS 102 and sends a Position Mobile Response message 617 from MPR 111 to external location application 115.

Figure 7:
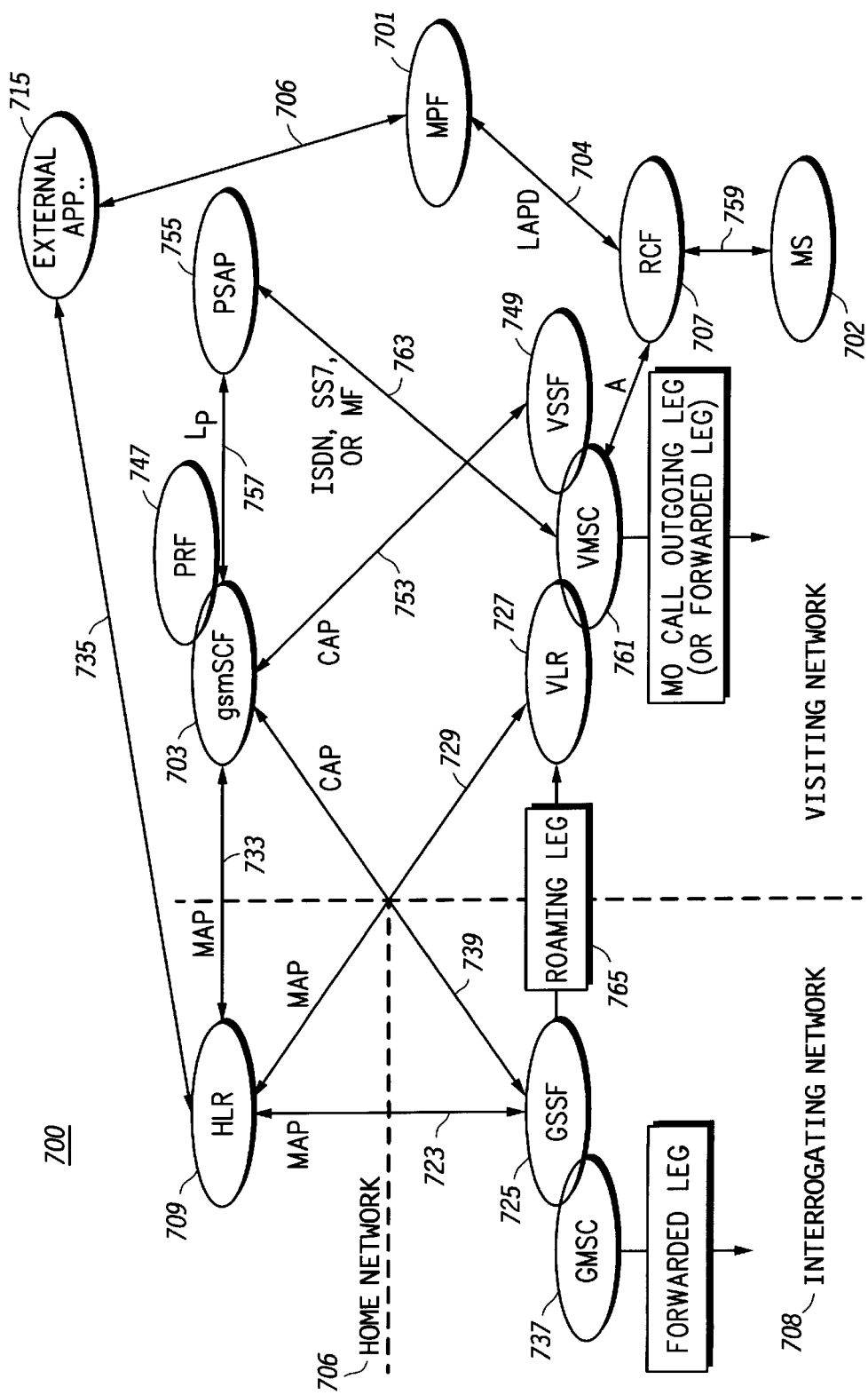
FIG. 7 depicts a functional model of a communication system in accordance with an alternate embodiment of the present invention.
Figure 8:
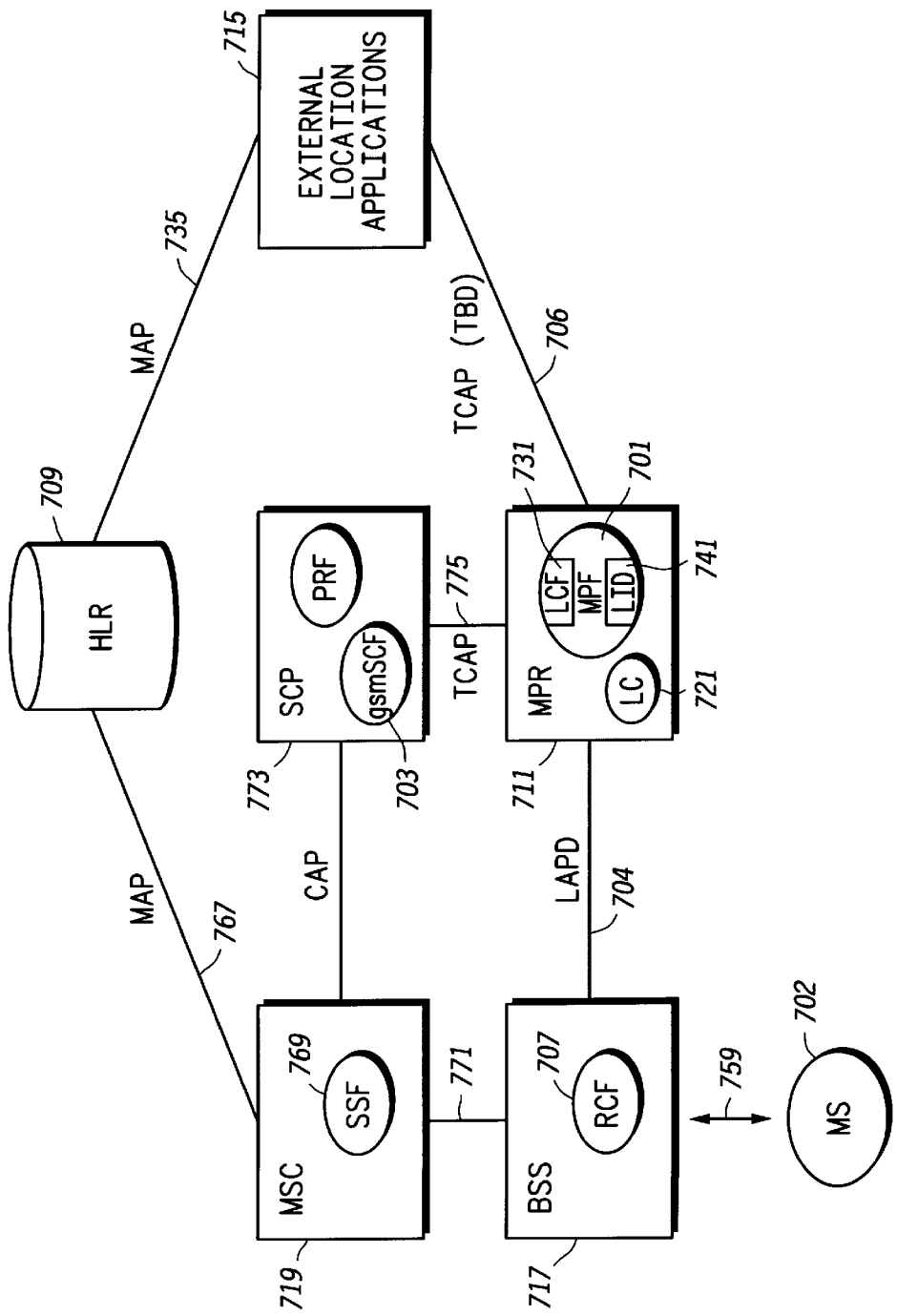
FIG. 8 depicts architecture of the network elements in accordance with the alternate embodiment of the present invention.

FIGS. 7 and 8 depict the functional architecture needed to support the Mobile-assisted Location Services as an extension of the CAMEL architecture.

FIG. 7 shows the functional entities involved in CAMEL calls requiring Location Services support. The Mobile-Assisted approach utilizes the mobile station itself to measure certain aspects of the signal it receives from the BTS such as TDOA, TOA, and AOA. MS 702 then transmits these measurements to the network where the final mobile position is calculated. In this approach, mobile station 702 acts as an LDE 713 and the MPR 711 treats the TDOA, TOA, or AOA measurements the same way it treats the LDE 113-generated measurements. The mobile-assisted approach requires air interface changes and MS enhancements. The air interface needs to support new messages that enable the network to trigger the mobile station to perform TDOA/TOA/AOA measurements and for the mobile station to report these measurements back to the network. The Mobile Station needs to be enhanced to be able to perform accurate TDAO or TOA measurements. The MS gathers TDOA or TOA measurements from multiple BTS sites in the network. These BTS sites must be transmitting continuously to allow the MS to gather sufficient measurements. Since each cell in a GSM system transmits continuously, at a minimum, on a broadcast control channel, the position of an MS can be determined even when the MS is not engaged in a call.

This section describes the new interfaces that are required to support Location Based Services for the mobile-assisted approach.

The RCF 707-MPF 701 Interface is an LAPD interface that allows MPF 701 to request signal measurement data from RCF 707. This interface also allows RCF 707 to request MPF 701 to compute an MS's position based on signal arrival data.

The RCF 707-LDF 705 Interface is an LAPD interface that allows RCF 707 to obtain the MS's signal measurements without involving the MS. FIG. 7 is substantially similar to FIG. 1, with the exception of removing LDF 105 and LAPD interface 145.

FIG. 8 depicts a preferred mapping of the network-centric architecture into network elements. A mobile-originated request for positioning may occur in the context of a call, or it may occur independent of a call. In both situations, the mobile initiates a request for positioning from the network. FIG. 8 is substantially similar to FIG. 2, but without LDE 133 and LAPD interface 145. In the embodiment depicted in FIG. 8, MS 702 communicates with BSS 717 and does not communicate with an LDE.

Figure 9:
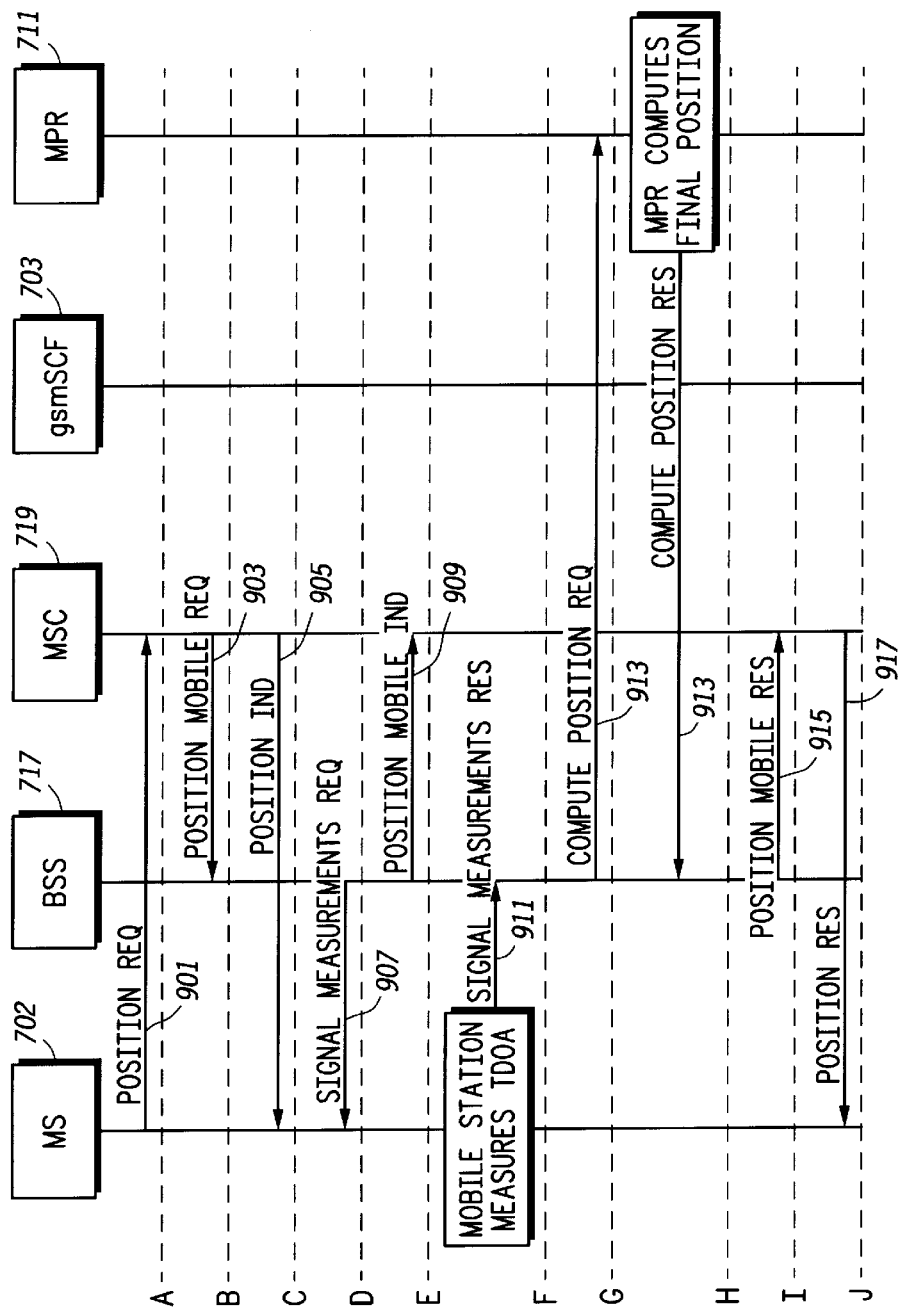
FIG. 9 depicts a communication call flow in accordance with the alternate embodiment of the present invention.

FIG. 9 depicts a call flow for handling a mobile station-originated request for positioning utilizing a mobile-assisted approach.

a) MS 702 requests its position from network 700 in a Position Request (DTAP) message 901 from MS 702 to MSC 719.

b) MSC 719 requests BSS 717 to locate the position of MS 702 in a Position Mobile Request message 903 from MSC 719 to BSS 717.

c) MSC 719 responds to MS 702 with a Position Indication (DTAP) message 905 from MSC 719 to MS 702.

d) BSS 117 requests signal information from MS 702 in a signal Request (RIL3-RR) message 907 from BSS 117 to MS 702.

e) BSS 717 responds to MSC 719 with a Position Mobile Indication message 909 from BSS 717 to MSC 719.

f) MS 702 performs signal measurements, such as TDOA, TOA, or AOA, and returns a TDOA Response (RIL3-RR) message 911 from MS 702 to BSS 717.

g) BSS 717 requests a location calculation from MPR 711 in a Compute Position Request message 913 from BSS 717 to MPR 711.

h) MPR 711 computes the position of MS 702 based on the received signal measurements and returns the computed MS position to BSS 717 in a Compute Position Response message 915 from MPR 711 to BSS 717.

i) MSC 719 reports the MS's position to MS 702 in a Position Response (DTAP) message 917 from MSC 719 to MS 702.

This procedure assumes that a network-originated request for positioning occurs in the context of a CAMEL message flow, with the location application residing in a GSM SCF 703. In such a message flow, MSC 719 performs an InitialDP procedure as specified in GSM 09.78, delivering the call to GSM SCF 703.

Figure 10:
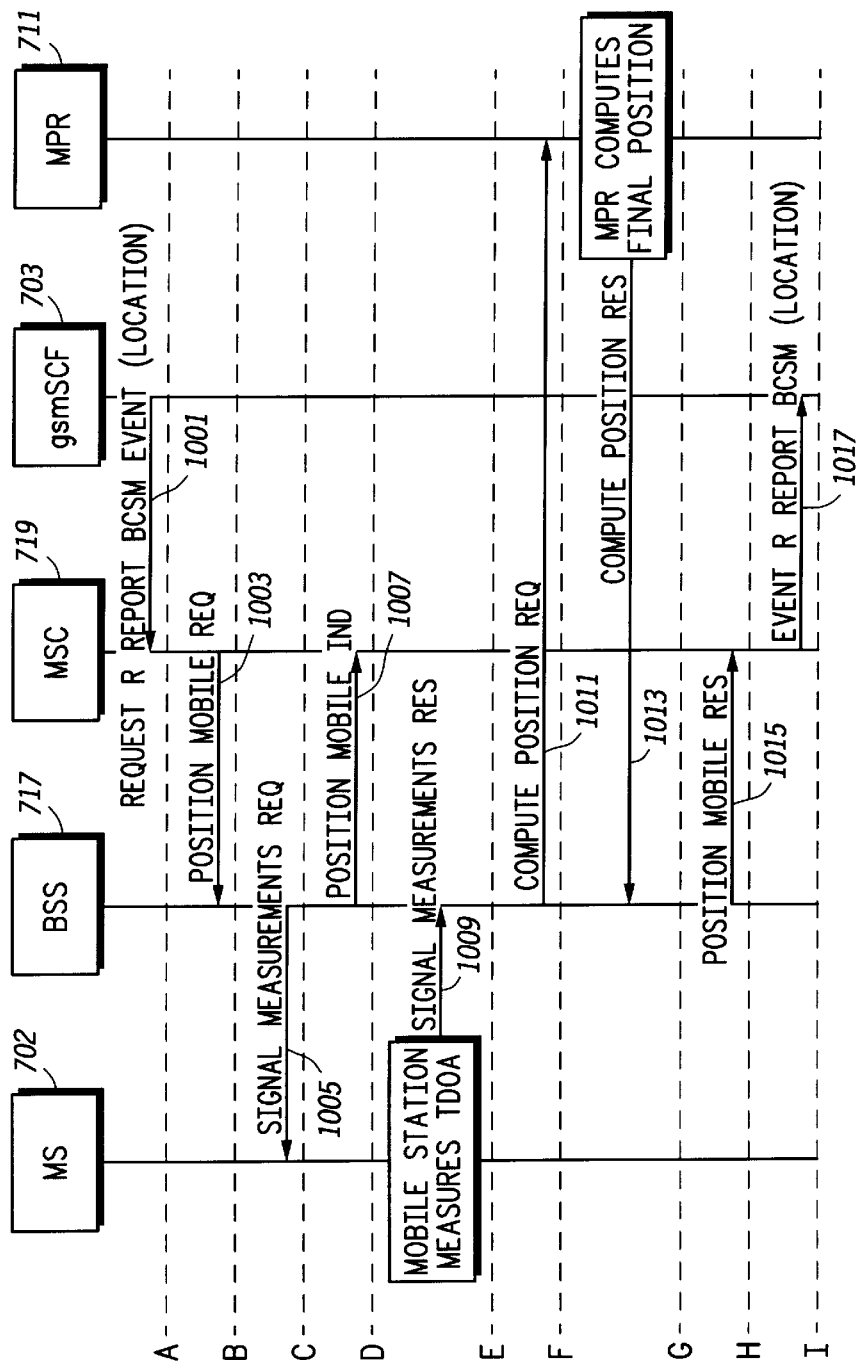
FIG. 10 depicts a communication call flow in accordance with the alternate embodiment of the present invention.

FIG. 10 depicts a message flow for a network-originated request for positioning utilizing a mobile station-assisted approach. The message flow depicted in FIG. 10 assumes that the call has been delivered to GSM SCF 703 and thus begins with a request from GSM SCF 703 to MSC 719 for a location and ends with MSC 719 reporting the location to GSM SCF 703. The rest of the GSM SCF 703-MSC 719 message flow is dependent on the location application and is beyond the scope of this message flow.

a) GSM SCF 703 requests MSC 719 to position MS 702 in a RequestReportBCSMEvent(Location) message 1001 from GSM SCF 703 to MSC 719.

b) MSC 719 requests BSS 717 to locate the position of MS 702 in a Position Mobile Request message 1003 from MSC 719 to BSS 717.

c) BSS 717 requests signal measurements, such as TDOA, TOA, and AOA, from MS 702 in a TDOA Request (RIL3-RR) message 1005 from BSS 717 to MS 702.

d) BSS 717 responds to MSC 719 with a Position Mobile Indication message 1007 from BSS 717 to MSC 719.

e) MS 702 performs signal measurements, such as TDOA, TOA, or AOA, and returns a TDOA Response (RIL3-RR) message 1009 from MS 702 to BSS 717.

f) BSS 717 requests a location calculation from MPR 711 in a Compute Position Request message 1011 from BSS 717 to MPR 711.

g) MPR 711 computes the MS position based on the received signal measurements and returns the computed MS position to BSS 717 in a Compute Position Response message 1013 from MPR 711 to BSS 717.

h) BSS 717 reports the MS's position to MSC 719 in a Position Mobile Response message 1015 from BSS 717 to MSC 719.

i) MSC 719 responds to GSM SCF 703 with the location of MS 702 in an EventReportBCSM(Location) message 1017 from MSC 719 to GSM SCF 703.

Figure 11:
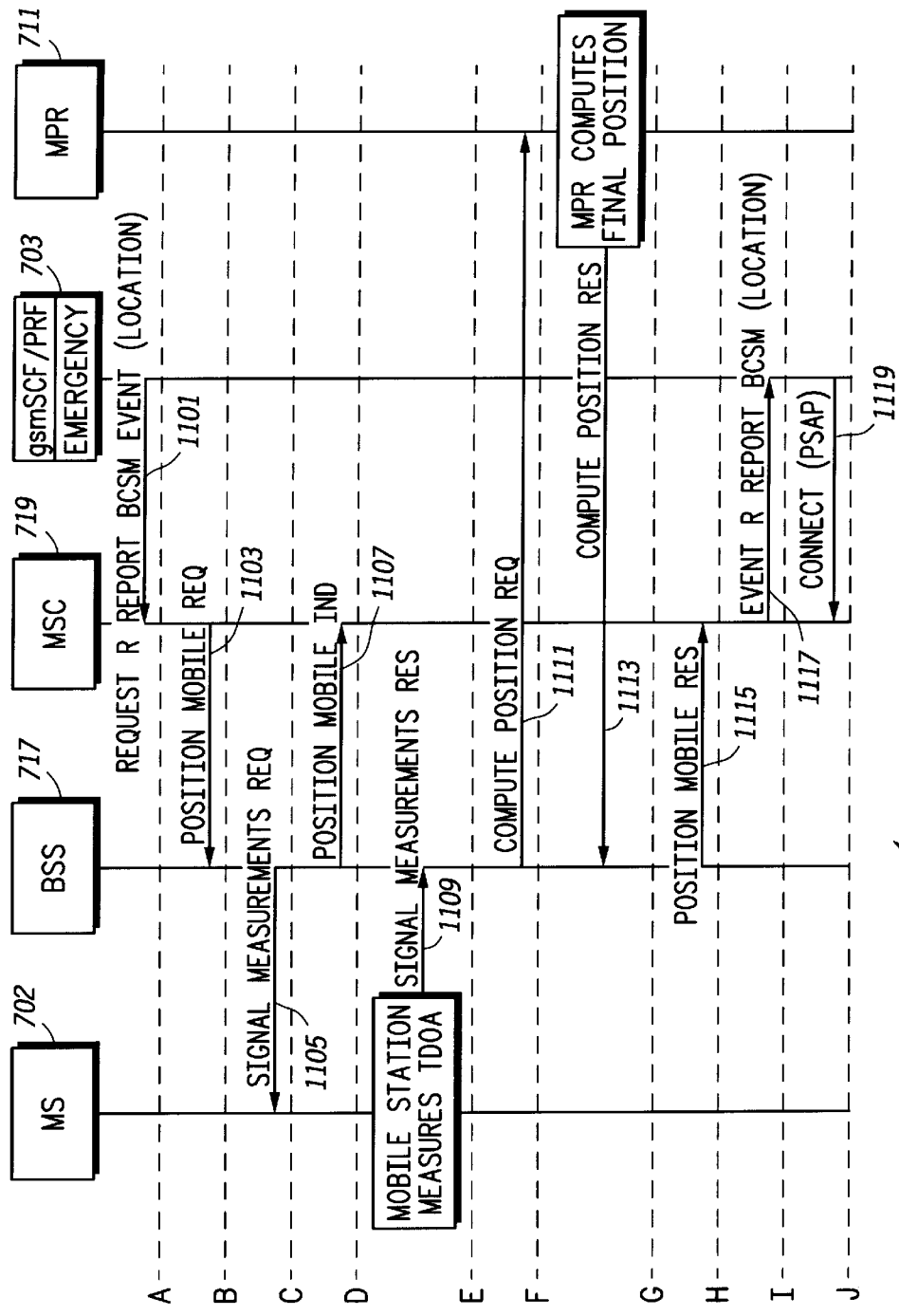
FIG. 11 depicts a communication call flow in accordance with the alternate embodiment of the present invention.

FIG. 11 depicts a message flow for emergency calls utilizing a mobile-assisted approach. In the embodiment as depicted in FIG. 11, GSM SCF 703 also contains the PSAP Routing Function (PRF). The PRF provides call routing information to direct the call to the PSAP serving the MS's location. Emergency calls proceed in a manner similar to a network-originated request for positioning in the preceding subsection. As with the network-originated message flow as depicted in FIG. 10, the request to locate the position of an MS originates from GSM SCF 703. In the case of emergency calls, however, GSM SCF 703 could be a special emergency services GSM SCF and will reside in the visited network, rather than in the caller's home network.

a) Emergency GSM SCF 703 requests MSC 719 to position MS 702 in a RequestReportBCSMEvent(Location) message 1101 from Emergency GSM SCF 703 to MSC 719.

b) MSC 719 requests BSS 717 to locate the position of MS 702 in a Position Mobile Request message 1103 from MSC 719 to BSS 717.

c) BSS 717 requests signal measurements, such as TDOA, TOA, or AOA, from MS 702 in a signal Request message 1105 from BSS 717 to MS 702.

d) BSS 717 responds to MSC 719 with a Position Mobile Indication message 1107 from BSS 717 to MSC 719.

e) MS 702 performs signal measurements, such as TDOA, TOA, or AOA, and returns a TDOA Response (RIL3-RR) message 1109 from MS 702 to BSS 717.

f) BSS 717 requests a location calculation from MPR 111 in a Compute Position Request message 1111 from BSS 717 to MPR 111.

g) MPR 111 computes the position of MS 702 based on the received signal measurements and returns the computed MS position to BSS 717 in a Compute Position Response message 1113 from MPR 111 to BSS 717.

h) BSS 717 reports the position of MS 702 to MSC 719 in a Position Mobile Response (BSS 717MAP) message 1115 from BSS 717 to MSC 719.

i) MSC 719 responds to Emergency GSM SCF 703 with the location of MS 702 in an EventReportBCSM(Location) message 1117 from MSC 719 to Emergency GSM SCF 703.

j) Emergency GSM SCF 703 directs MSC 719 to route the call to the appropriate PSAP in a Connect(PSAP) message 1119 from Emergency GSM SCF 703 to MSC 719.

As stated above, this message flow assumes that Emergency GSM SCF 103 and PRF are combined. Alternatively, Emergency GSM SCF 103 and the PRF could be two separate functions. In this case, Emergency GSM SCF 103 queries the PRF with the MS's location and receives the routing number of the serving PSAP. Emergency GSM SCF 103 then returns the routing number and MS location to MSC 119.

Figure 12:
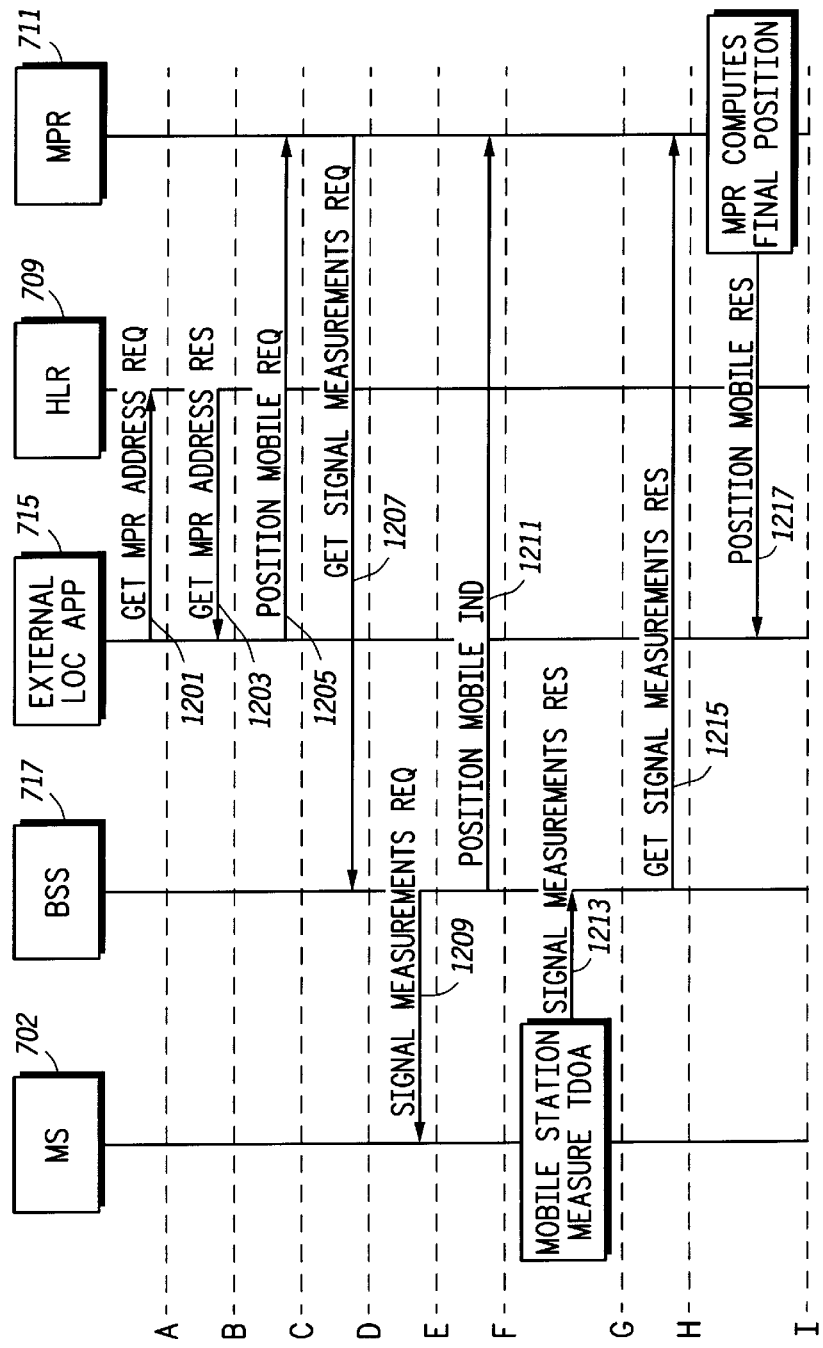
FIG. 12 depicts a communication call flow in accordance with the alternate embodiment of the present invention.

FIG. 12 depicts a call flow for external applications to acquire mobile station location information utilizing a mobile-assisted approach. The call flow ends with the external application receiving the location of the application. Requests for position from an external application proceeds in a manner similar to a network-originated request for positioning. As with the network-originated message flow above, the request to locate the position of an MS need not be associated with a call.

a) External location application 715 begins the process of requesting the position of MS 702 from the network by sending a Get MPR Address Request message 1201 from external application 715 to HLR 709.

b) HLR 709 returns the address of MPR 711 serving MS 702 in a Get MPR Address Response message 1203 from HLR 709 to the external application 715.

c) External location application 715 requests the position of MS 702 from MPR 711 by sending a Position Mobile Request message 1205 from external application 715 to MPR 711.

d) MPR 711 requests position information from BSS 717 by sending a Get Position Data Request message 1207 from MPR 711 to BSS 717.

e) BSS 717 requests signal measurements, such as TDOA, TOA, and AOA, from MS 702 by sending a TDOA Request (RIL3-RR) message 1209 from BSS 717 to MS 702.

f) BSS 717 responds to MSC 719 with a Position Mobile Indication (BSS 717MAP) message 1211 from BSS 717 to MSC 719.

g) MS 702 performs signal measurements, such as TDOA, TOA, or AOA, and returns a TDOA Response (RIL3-RR) message 1213 from MS 702 to BSS 717.

h) Upon receiving the signal measurements from MS 702, BSS 717 sends a Get Position Data Response message 1215 containing the signal measurements of MS 702 to MPR 711.

i) MPR 711 uses the signal measurements to calculate the position of MS 702 and then sends a Position Mobile Response message 1217 from MPR 711 to external location application 715.

While this invention has been described in terms of certain examples thereof, it is not intended that it be limited to the above description, but rather only to the extent set forth in the claims that follow.

We claim:

1. A method for positioning a mobile station, the method comprising the steps of:
   requesting, by a Base Station Subsystem, positioning information for a mobile station from Location Determination Equipment;
   returning, by the Location Determination Equipment, signal measurements relating to the mobile station to the Base Station Subsystem;
   requesting, by the Base Station Subsystem, a location calculation from a Mobile Positioning Register;
   computing, by the Mobile Positioning Register, the position of the mobile station based at least in part upon the signal measurements; and
   returning the position of the mobile station to the Base Station Subsystem.

2. A method for positioning a mobile station in accordance with claim 1, the method further comprising, prior to the step of requesting positioning information from Location Determination Equipment, the steps of:
   requesting, by a mobile station, a mobile station position; and
   requesting, by a Mobile Switching Center, a Base Station Subsystem to position the mobile station.

3. A method for positioning a mobile station in accordance with claim 1, the method further comprising the steps of:
   reporting, by the Base Station Subsystem, the position of the mobile station to a Mobile Switching Center; and
   reporting, by the Mobile Switching Center, the position of the mobile station to the mobile station.

4. A method for positioning a mobile station, the method comprising the steps of:
   requesting, by the Base Station Subsystem, signal measurements from Location Determination Equipment;
   performing, by the Location Determination Equipment, signal related measurements;
   returning, by the Location Determination Equipment, signal measurements to the Base Station Subsystem;
   requesting, by the Base Station Subsystem, a location calculation from a Mobile Positioning Register, the request including the signal measurements; and
   computing, by the Mobile Positioning Register, the position of the mobile station based at least in part upon the signal measurements.

5. A method for positioning a mobile station in accordance with claim 4, wherein the step of requesting signal measurements comprises the step of requesting the time difference of arrival.

6. A method for positioning a mobile station in accordance with claim 4, wherein the step of requesting signal measurements comprises the step of requesting the angle of arrival.

7. A method for positioning a mobile station in accordance with claim 4, wherein the step of requesting signal measurements comprises the step of requesting the time of arrival.

8. A method for positioning a mobile station in accordance with claim 4, the method further comprising the steps of:
   returning, by the Mobile Positioning Register, the computed mobile station position to the Base Station Subsystem;
   reporting, by the Base Station Subsystem, the position of the mobile station to a Mobile Switching Center; and
   responding, by the Mobile Switching Center, to a GSM SCF with the position of the mobile station.

9. A method for positioning a mobile station, the method comprising the steps of:
   requesting, by a Base Station Subsystem, signal measurements from Location Determination Equipment;
   performing, by the Location Determination Equipment, location-related measurements;
   returning, by the Location Determination Equipment, signal measurements to the Base Station Subsystem;
   requesting, by the Base Station Subsystem, a location calculation from the Mobile Positioning Register, the request including the signal measurements; and
   computing, by the Mobile Positioning Register, the position of the mobile station based at least in part upon the signal measurements.

10. A method for positioning a mobile station in accordance with claim 9, wherein the step of requesting signal measurements comprises the step of requesting the time difference of arrival.

11. A method for positioning a mobile station in accordance with claim 9, wherein the step of requesting signal measurements comprises the step of requesting the time of arrival.

12. A method for positioning a mobile station in accordance with claim 9, wherein the step of requesting signal measurements comprises the step of requesting the angle of arrival.

13. A method for positioning a mobile station in accordance with claim 9, the method further comprising the steps of:
   returning, by the Mobile Positioning Register, the computed position of the mobile station to the Base Station Subsystem;
   reporting, by the Base Station Subsystem, the position of the mobile station to the Mobile Switching Center;
   responding, by the Mobile Switching Center, to the Emergency GSM SCF with the location of the mobile station; and
   directing, by the Emergency GSM SCF, the Mobile Switching Center to route the call to the appropriate Public Safety Answering Point.

14. A method for positioning a mobile station in accordance with claim 13, wherein the step of directing the Mobile Switching Center to route the call comprises the steps of:
   querying, by the Emergency GSM SCF, the Public Safety Answering Point with the location of the mobile station;
   receiving, by the Emergency GSM SCF, a routing number associated with the Public Safety Answering Point; and
   returning, by the Emergency GSM SCF, the routing number associated with the Public Safety Answering Point and the location of the mobile station to the Mobile Switching Center.

15. A method for positioning a mobile station, the method comprising the steps of:
   requesting, by the external location application, the location of a mobile station from a Mobile Positioning Register;
   requesting, by the Mobile Positioning Register, position information from the Base Station Subsystem;
   requesting, by the Base Station Subsystem, information relating to the location of the mobile station from the Location Determination Equipment;
   performing, by the Location Determination Equipment, signal measurements;
   returning, by the Location Determination Equipment, signal measurements to the Base Station Subsystem;
   sending, by the Base Station Subsystem the signal measurements to the Mobile Positioning Register; and
   using, by the Mobile Positioning Register, the signal measurements to calculate the position of the mobile station.

16. A method for positioning a mobile station in accordance with claim 15, the method further comprising, prior to requesting the location of the mobile station from the Mobile Positioning Register, the steps of:
   sending an address request message from an external application to a Home Location Register; and
   returning, by the Home Location Register to the external application, the address of a Mobile Positioning Register serving a mobile station.

17. A method for positioning a mobile station in accordance with claim 15, wherein the step of requesting information relating to the location of the mobile station comprises the step of requesting time difference of arrival from the Location Determination Equipment.

18. A method for positioning a mobile station in accordance with claim 15, wherein the step of requesting information relating to the location of the mobile station comprises the step of requesting time of arrival from the Location Determination Equipment.

19. A method for positioning a mobile station in accordance with claim 15, wherein the step of requesting information relating to the location of the mobile station comprises the step of requesting angle of arrival from the Location Determination Equipment.

20. A method for positioning a mobile station, the method comprising the steps of:
   requesting, by a Base Station Subsystem, signal information from a mobile station;
   performing, by the mobile station, signal measurements;
   returning, by the mobile station, signal measurements to the Base Station Subsystem;
   requesting, by the Base Station Subsystem, a location calculation from the Mobile Positioning Register, the request including the signal measurements;
   computing, by the Mobile Positioning Register, the position of the mobile station based at least in part upon the signal measurements; and
   returning the computed mobile station position to the Base Station Subsystem.

21. A method for positioning a mobile station in accordance with claim 20, the method further comprising, prior to requesting signal information from the mobile station, the steps of:
   requesting, by a mobile station, the position of the mobile station from a Mobile Switching Center; and
   requesting, by the Mobile Switching Center, a Base Station Subsystem to locate the position of the mobile station.

22. A method for positioning a mobile station, the method comprising the steps of:
   requesting, by a Base Station Subsystem, signal measurements from the mobile station;
   performing, by the mobile station, signal measurements;
   returning, by the mobile station, signal measurements to the Base Station Subsystem;
   requesting, by the Base Station Subsystem, a location calculation from the Mobile Positioning Register, the request including the signal measurements; and
   computing, by the Mobile Positioning Register, the position of the mobile station based at least in part upon the signal measurements.

23. A method for positioning a mobile station in accordance with claim 22, the method further comprising, prior to requesting signal measurements from the mobile station, the steps of:
   requesting, by a GSM SCF, a Mobile Switching Center to position a mobile station; and
   requesting, by the Mobile Switching Center, a Base Station Subsystem to locate the position of the mobile station.

24. A method for positioning a mobile station in accordance with claim 22, the method further comprising the step of returning, by the Mobile Positioning Register, the computed mobile station position to the Base Station Subsystem.

25. A method for positioning a mobile station in accordance with claim 24, the method further comprising the steps of:
reporting, by the Base Station Subsystem, the position of the mobile station to the Mobile Switching Center; and
responding, by the Mobile Switching Center, to the GSM SCF with the location of the mobile station.

26. A method for positioning a mobile station, the method comprising the steps of:
requesting, by a Base Station Subsystem, signal measurements from a mobile station;
performing, by the mobile station, signal measurements;
returning, by the mobile station, signal measurements to the Base Station Subsystem;
requesting, by the Base Station Subsystem, a location calculation from the Mobile Positioning Register, the request including the signal measurements; and
computing, by the Mobile Positioning Register, the position of the mobile station based at least in part upon the signal measurements.

27. A method for positioning a mobile station in accordance with claim 26, the method further comprising, prior to the step of requesting signal measurements from the mobile station, the steps of:
requesting, by an Emergency GSM SCF, a Mobile Switching Center to position a mobile station; and
requesting, by the Mobile Switching Center, a Base Station Subsystem to locate the position of the mobile station.

28. A method for positioning a mobile station in accordance with claim 26, the method further comprising the steps of:
returning the computed position of the mobile station to the Base Station Subsystem; and
reporting, by the Base Station Subsystem, the position of the mobile station to the Mobile Switching Center.

29. A method for positioning a mobile station in accordance with claim 28, the method further comprising the steps of:
responding, by the Mobile Switching Center, to the Emergency GSM SCF with the location of the mobile station; and
directing, by the Emergency GSM SCF, the Mobile Switching Center to route the call to a Public Safety Answering Point.

30. A method for positioning a mobile station in accordance with claim 26, the method further comprising the steps of:
querying, by the Emergency GSM SCF, a routing function with the location of the mobile station;
receiving the routing number of a Public Safety Answering Point; and
returning, by an Emergency GSM SCF, the routing number and the location of the mobile station to the Mobile Switching Center.

31. A method for positioning a mobile station, the method comprising the steps of:
requesting, by an external location application, the position of a mobile station from a Mobile Positioning Register;
requesting, by the Mobile Positioning Register, position information from a Base Station Subsystem;
requesting, by the Base Station Subsystem, signal measurements from the mobile station;
performing, by the mobile station, signal measurements;
returning, by the mobile station, signal measurements to the Base Station Subsystem;
sending, by the Base Station Subsystem, the signal measurements to the Mobile Positioning Register; and
using, by the Mobile Positioning Register, the signal measurements to calculate the position of the mobile station.

32. A method for positioning a mobile station in accordance with claim 31, the method further comprising, prior to the step of requesting the position of the mobile station from the Mobile Positioning Register, the steps of:
sending an address request message from an external application to a Home Location Register; and
returning the address of the Mobile Positioning Register serving the mobile station from the Home Location Register to the external application.

33. A method for positioning a mobile station in accordance with claim 31, the method further comprising the step of sending a Position Mobile Response message from the Mobile Positioning Register to the external location application.

* * * * *